United States Patent [19]

Lin

[11] Patent Number: 4,470,403

[45] Date of Patent: Sep. 11, 1984

[54] SALTLESS SOLAR POND

[75] Inventor: Edward I. H. Lin, La Canada, Calif.

[73] Assignee: The United States of America as represented by the Administrator of the National Aeronautics and Space Administration, Washington, D.C.

[21] Appl. No.: 383,068

[22] Filed: May 28, 1982

[51] Int. Cl.$^3$ ................................................ F24J 3/02
[52] U.S. Cl. ........................................ 126/415; 4/498
[58] Field of Search ............... 126/400, 415, 441, 445; 4/498, 499, 493; 165/45

[56] References Cited

U.S. PATENT DOCUMENTS

| | | | |
|---|---|---|---|
| 3,072,920 | 1/1963 | Yellott | 126/415 |
| 3,893,443 | 7/1975 | Smith | 126/415 |
| 3,949,095 | 4/1976 | Pelehach et al. | 126/415 |
| 4,015,583 | 4/1977 | Laing | 4/493 X |
| 4,019,496 | 4/1977 | Cummings | 126/441 |
| 4,022,187 | 5/1977 | Roberts | 126/415 |
| 4,138,990 | 2/1979 | Hussmann | 126/441 |

FOREIGN PATENT DOCUMENTS 2717070  11/1977  Fed. Rep. of Germany ...... 126/415

OTHER PUBLICATIONS

Edwards, D. K. and Catton, Ivan, "Prediction of Heat Transfer . . . ", *International Journal of Heat and Mass Transfer*, vol. 12, 22–30, (1969).

Marsh, H. I. et al., "Salt-gradient Solar Ponds in the Salton Sea: Brine Optical Quality and Performance", IECEC proceedings, (1981).

McMurrin, J. C., "Model, Tests and Optimization of Flat Plate Solar Collectors, with Emphasis on Sinusoidal Honeycomb", M.S. Thesis, UCLA, (1979).

Hollands, K. G. T., "Honeycomb Devices in Flat Plate Solar Collectors", Solar Energy, vol. 9, No. 3, p. 159, (1965).

Lin; E. I. H., "A Review of the Salt-gradient Solar Pond Technology", report in preparation.

Buchberg, H., Edwards, D. K., and MacKenzie, J. D., "Transparent Glass Honeycomb Structures for Energy Loss Control", Final Report to DOE, UCLA, (1980).

*Primary Examiner*—Randall L. Green
*Attorney, Agent, or Firm*—Paul F. McCaul; Thomas H. Jones; John R. Manning

[57] ABSTRACT

A solar pond (16) adapted for efficiently trapping and storing radiant solar energy without the use of a salt concentration gradient in the pond is disclosed. A body of water (20) which may be fresh, saline, relatively clear or turbid, is substantially covered by a plurality of floating honeycomb panels (18). The honeycomb panels (18) are made of a material such as glass which is pervious to short wave solar radiation but impervious to infrared radiation. Each honeycomb panel (18) includes a multitude of honeycomb cells (42) having a height-to-width aspect ratio of at least approximately 14 to 1. The honeycomb panels (18) are divided into the elongated honeycomb cells (42) by a multitude of intermediate plates (44) disposed between a bottom plate (34) and top plate (36) of the panel (18). The solar pond (16) of the invention is well suited for providing hot water of approximately 85°–90° C. temperature for direct heating applications, and for electrical power generation.

9 Claims, 7 Drawing Figures

SALTLESS SOLAR POND

BACKGROUND OF THE INVENTION

Origin of the Invention

The invention described herein was made in the performance of work under a NASA Contract and is subject to the provisions of Section 305 of the National Aeronautics and Space Act of 1958, Public Law 85-568 (72 STAT 435; 43 USC 2457).

FIELD OF THE INVENTION

The present invention is directed to the field of large-scale solar energy collection and storage devices. More particularly, the present invention is directed to a solar pond construction.

Brief Description of the Prior Art

Solar energy collecting devices have been known in the prior art for a long time. More particularly, approximately during the last decade, solar energy collecting devices having a large body of water for absorbing solar radiation and for storing the resulting thermal energy were developed in this country and abroad. The large body of heated water is utilized for direct heating purposes, such as space heating, or in a heat exchanger to vaporize a relatively low boiling liquid to drive the turbine of a substantially conventional Rankine cycle power generating system. In other words, the solar energy captured by the large body of water, customarily referred to as a "solar pond", is suitable for direct heating applications and for electrical or mechanical power generation as well.

Prior art solar ponds, however, have invariably required saline water or high concentration in the pond. More specifically, prior art solar ponds depend for their operation on the establishment and maintenance of a salt concentration gradient in the pond wherein the salt concentration increases with increasing depth in the pond.

As it is well appreciated by those skilled in the art, the salt concentration gradient of the above-noted type results in a density gradient, wherein saline water in the bottom layers of the pond is heavier than water of lesser salt concentration in the upper layers of the pond. As a consequence, global convection is ideally eliminated, or is at least severely suppressed, in the pond so that heat absorbed by the pond is not continuously exchanged with the overlying atmosphere due to continuous rise of warm water to the surface of the pond.

As it will be further appreciated by those skilled in the art, natural bodies of water, such as lakes or natural ponds, and ordinary man-made ponds or pools having no salt gradient, are relatively inefficient for collecting and storing solar energy, precisely because natural convection causes these bodies of water to be in continuous and relatively efficient heat exchange relationship with the atmosphere.

Although the effectiveness, and in some instances even the economic feasibility of the salt gradient solar ponds for energy production has been adequately demonstrated mainly in this country and in Israel, salt gradient solar ponds suffer from bath advantages and disadvantages. On the positive side, salt gradient ponds have been demonstrated to be capable of prolonged continuous operation, reach adequately high temperatures for power generation, such as 80°-90° C., and withstand adverse weather conditions, such as high winds, with the salt gradient substantially intact. Perhaps most importantly, salt gradient solar ponds have been demonstrated to be capable of providing a substantially continuous source of heat for electrical power generation. One pond constructed in Israel, for example, has an approximately 150 $kW_e$ energy output. The designation 150 $kW_e$ in this regard signifies that the above-noted pond provides 150 kilowatts (150,000 Joules/second) of usable electrical power.

On the negative side, salt gradient solar ponds are expensive to construct because they require a very large amount (up to several thousands of tons per acre) of salt, such as NaCl or $MgCl_2$. For illuminating the requirement for large amounts of salt, it is noted that salt concentration in the bottom layers of a solar pond is about 20 percent or more by weight, and a few percent in the top layers. As is known by those skilled in the art, the salt is required not only for initial construction of the pond, but a continuous, albeit smaller, supply is necessary to maintain the salt gradient in the pond. This is because natural diffusion tends to destroy the salt gradient in the pond, and therefore, in order to maintain the gradient, salt is periodically added to the bottom of the pond while the surface of the pond is periodically flushed with fresh water or water of low salinity. The requirement for large amounts of salt renders pond construction particularly expensive where the salt is not locally available on the pond construction site.

In order to protect the groundwater table from contamination by water of high (over 20% by weight) salt concentration, solar ponds often require a water-impervious liner. Furthermore, because of the stratified nature of the salt gradient solar ponds, the bottom of the pond must be substantially even, flat and level. The latter requirement eliminates many natural ponds, or depressions in the ground from conversion to a salt-gradient solar pond.

Still another disadvantage of salt gradient solar ponds is that the maintenance of the salt gradient requires constant vigilance and expensive equipment associated with the solar pond, such as separate evaporation and brine storage ponds, water treatment systems, a wave suppressing network, and a brine leakage detection system.

A still further disadvantage of the salt gradient solar ponds is that the amount of hot brine which may be extracted from the bottom layer of the pond for heating or power generation is limited by the condition that the established salt gradient must not be seriously disturbed. The brine is highly corrosive and renders the equipment, such as pumps and heat exchangers used in conjunction with the solar pond, expensive to construct and maintain.

Furthermore, a significant amount of water is lost from the surface of the pond by evaporation. The latter disadvantage is particularly serious in arid regions, precisely where due to abundant sunshine solar ponds have a high potential to provide a significant contribution to the overall energy supply.

For further description of salt gradient solar pond technology, reference is made to the publications: "A Review of the Salt-Gradient Solar Pond Technology," by E. I. H. Lin, Jan. 30, 1982, JPL Publication 81-116; and "Salt-Gradient Solar Ponds in the Salton Sea: Brine Optical Quality and Performance," by H. E. Marsh et al., IECEC Proceedings (1981).

In light of the foregoing, it is readily apparent that there is a need in the prior art for an improved solar pond technology which does not require the use of a salt concentration gradient, or highly saline water, and which therefore eliminates many of the disadvantages attendant with the use of the salt gradient in a solar pond. The present invention provides this technology.

SUMMARY OF THE INVENTION

It is an object of the present invention to provide a solar pond which is capable of absorbing and storing significant amounts of solar energy without the maintenance of a salt concentration gradient in the pond.

It is another object of the present invention to provide a solar pond which does not require a liner on the bottom of the pond, and may possess a substantially even and flat bottom surface.

It is still another object of the present invention to provide a solar pond construction which may be readily implemented in existing natural bodies of water or portions thereof, and which may utilize the natural body of water as a heat sink in an electrical power generating process.

These and other objects and advantages are attained by a solar pond construction wherein a honeycomb structure floats and covers substantially the entire surface of the pond. The buoyant structure includes a plurality of honeycomb panels, which are disposed with their edges substantially adjacent to one another on the surface of the pond. Each honeycomb panel has an enclosing lower plate disposed on the surface and substantially parallel therewith, an enclosing upper plate substantially parallel with the lower plate and enclosing side plates. A multitude of intermediate plates are disposed substantially vertically between the upper and lower plates and define a multitude of honeycomb cells therein. The honeycomb cells have a height-to-width or aspect ratio which is at least approximately in the 14 to 1 range. The honeycomb panels, or at least the lower, upper and intermediate plates thereof, are made of a material such as glass which is pervious to short wave solar radiation but substantially impervious to infrared radiation, so that a substantial portion of radiant solar energy incident upon the honeycomb structure is trapped in the form of thermal energy in the underlying body of water. Because of the excellent insulating properties of the honeycomb structure, loss of heat from the water through the honeycomb structure is effectively minimized. The hot water of the solar pond is suitable for direct heating applications, and for electrical power generation.

The features of the present invention can be best understood together with further objects and advantages by reference to the following description, taken in connection with the accompanying drawings, wherein like numerals indicate like parts.

DESCRIPTION OF THE PREFERRED EMBODIMENTS

Figure 1:
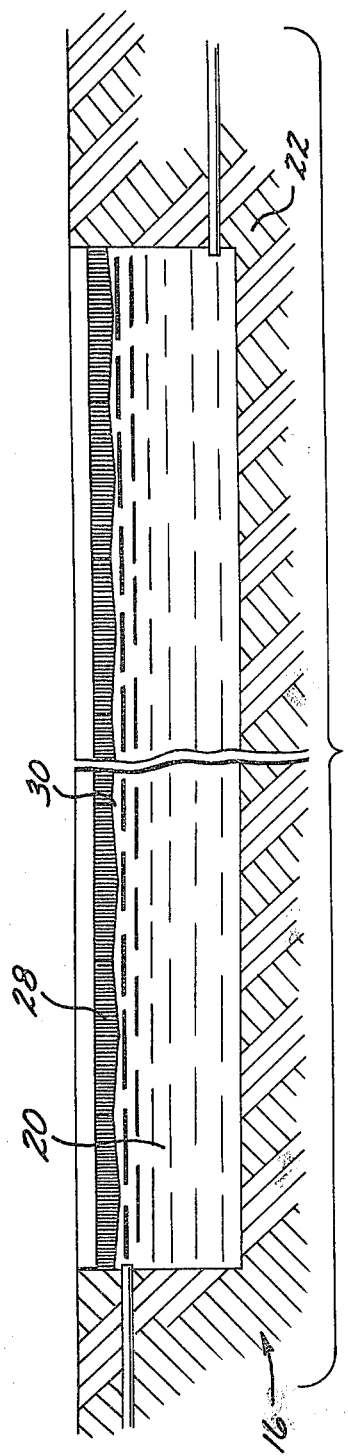
FIG. 1 is a schematic, cross-sectional view of a solar pond constructed in accordance with principles of the present invention.

The following specification taken in conjunction with the drawings sets forth the preferred embodiments of the present invention in such a manner that any person skilled in the solar pond constructing arts can use the invention. The embodiments of the invention disclosed herein are the best modes contemplated by the inventor for carrying out his invention in a commercial environment, although it should be understood that various modifications can be accomplished within the parameters of the present invention.

Referring now to FIGS. 1-5 of the appended drawings, the principles of construction of a solar pond 16 in accordance with the present invention, and a first preferred embodiment of a honeycomb panel 18 used in association with the solar pond 16, is disclosed. The solar pond 16 includes a large body of water 20 in the form of a pond, lake, reservoir or the like, which is situated either in a natural or man-made depression in the ground 22. For example, the solar pond 16 may be situated in a pit dug in the ground 22, as is shown on FIG. 1, or the solar pond 16 may comprise a natural lake. As still another alternative, the body of water 20 of the solar pond 16 may be a portion of a natural body of water, i.e., the body of water 20 may be confined among natural embankments 24 and man-made dikes 26, as is shown on FIG. 7.

The depth of the body of water 20 of the solar pond 16 may vary substantially between 2-6 meters, as in the case of the prior art salt gradient ponds. However, because the present invention does not require the establishment and maintenance of an intermediate salt gradient zone in the pond, if desired, the pond may be constructed significantly shallower or deeper than a comparable prior art salt gradient pond.

As in the case of prior art salt gradient solar ponds, the surface area of the solar pond 16 of the present invention may also vary substantially. In other words, the solar pond 16 of the present invention may be comparable in size to a small- to medium-size swimming pool, or may have a surface area extending to several square kilometers. A swimming pool or like sized solar pond of the present invention is well suited for providing hot water for space heating and like applications, while a very large solar pond having several square kilometers in surface are is well adapted for large-scale electrical power generation.

A critical feature of the solar pond construction in accordance with the present invention is that a specifically designed honeycomb structure 28 covers substantially the entire surface 30 of the body of water 20 which comprises the solar pond 16. The function of the honeycomb structure 28 is to permit penetration of short wave solar radiation into the body of water, 20, and to substantially eliminate or minimize loss of heat from the body of water 20 into the atmosphere. In order to accomplish this purpose, the honeycomb structure 28 must be made of a material which is pervious to short wave radiation, thereby allowing the solar rays to enter into the water wherein the rays are absorbed and converted into thermal energy. Furthermore, in order to prevent escape of thermal energy from the body of water 20 by infrared radiation, the material of the honeycomb structure 28 must be substantially impervious to infrared radiation. Glass has the above-noted characteristics, and therefore is ideally suited for this purpose. However, other materials, such as certain plastics may also satisfy the above-noted requirements, and therefore may be suitable for construction of the honeycomb structure 28. Specifically, a polyester material commonly available under the trade name MYLAR is suitable for construction of the honeycomb structure 28.

In addition to preventing loss of heat from the body of water 20 by infrared radiation, the structure disposed on the surface 30 of the body of water 20 must also prevent loss of heat by convection and conduction. As it will become apparent from the ensuing description, the honeycomb structure 28 utilized in the present invention also satisfies these additional requirements.

Figure 3:
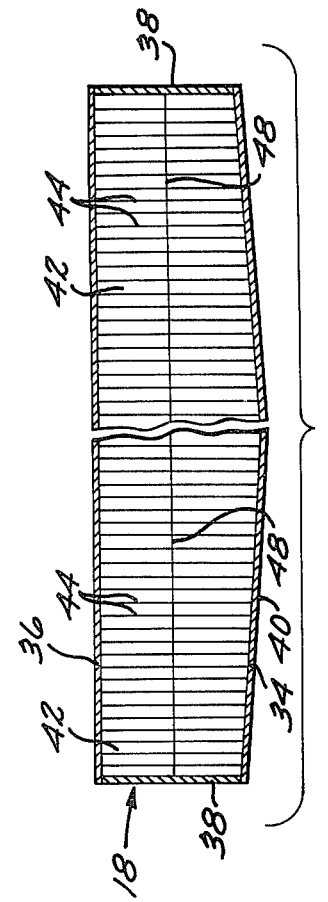
FIG. 3 is a schematic cross-sectional view of the honeycomb panel shown on FIG. 2, the cross-section being taken at lines 3,3 of FIG. 2.
Figure 2:
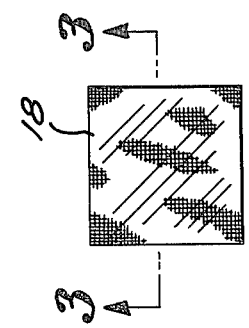
FIG. 2 is a top view of a first embodiment of a honeycomb panel utilized in the solar pond of the present invention.

Referring now principally to FIGS. 2, 3, 4 and 5, the honeycomb structure 28 is described in detail. FIGS. 2 and 3 show a honeycomb panel 18, such as an eight-foot by eight-foot honeycomb panel 18 which includes a bottom plate 34, a top plate 36, and side plates 38. As it was noted above, the bottom, top and side plates 34, 36 and 38 are preferably made of glass. Since the bottom, top and side plates 34, 36 and 38 must have substantial structural integrity, they are made of high-strength glass such as Fourco cleartemp tempered low-iron coverglass.

The bottom plate 34, top plate 36 and side plates 38 of the honeycomb panel 18 are mounted to one another in a liquid-tight manner, so that by virtue of the air trapped in the panel 18, the panel 18 floats on the surface 30 of the body of water 20. While floating, the bottom plate 34 of the panel 18 is disposed substantially parallel with the surface 30. Although the cross-sectional view of FIG. 3 shows the bottom plate to be somewhat cambered or inclined from its center in an outwardly and upwardly direction toward the side plates 38, the camber or inclination of the bottom plate 34 is exaggerated on the drawing for the sake of illustration. The purpose of the slight camber of the bottom plates 34 is to aid release of water vapor and gas bubbles in the slight gaps existing between adjacent panels 18. Thus, the bottom plate 34 is substantially flat, so that practically the entire lower surface 40 of the bottom plate 34 is in contact with the water 20. The top plate 36 of the honeycomb panel 18 is also substantially flat, and is disposed substantially horizontally, substantially parallel with the surface 30 of the water 20.

A plurality of honeycomb panels 18 are provided in accordance with the present invention, disposed with their respective edges substantially adjacent to one another so as to cover substantially the entire surface 30 of the body of water 20. Depending on the size of the solar pond 16, several dozen to several thousand honeycomb panels 18 are required to cover the surface 30 of the body of water 20. For illustration, about twenty-five (25) eight-foot by eight-foot panels are needed to cover the surface of a relatively small, forty- by forty-foot solar pond, about six hundred and eighty (680) panels 18 are needed to cover the surface of an acre-sized solar pond, and about one hundred sixty eight thousand one hundred eighty-five (168,185) panels 18 are needed to cover the surface of a one (1) km² solar pond, such as one which may be used for large-scale generation of electrical power. The panels 18 may be joined to one another with proper expansion joints (not shown).

The panels 18, of course, may be longer or smaller than eight feet by eight feet square, or other than square-shaped panels may be used. In this regard it is noted that the surface area of the panels and their shape is not critical. What is critical is that each of the panels incorporate the hereinbelow described honeycomb cells 42.

Figure 4:
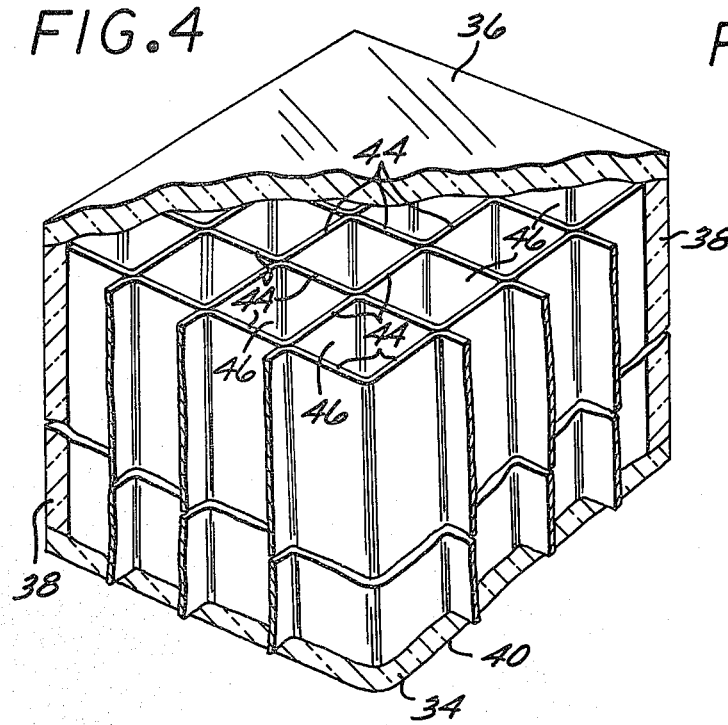
FIG. 4 is a schematic, perspective, partially broken away view of the first embodiment of the honeycomb panel utilized in the solar pond of the present invention.
Figure 5:
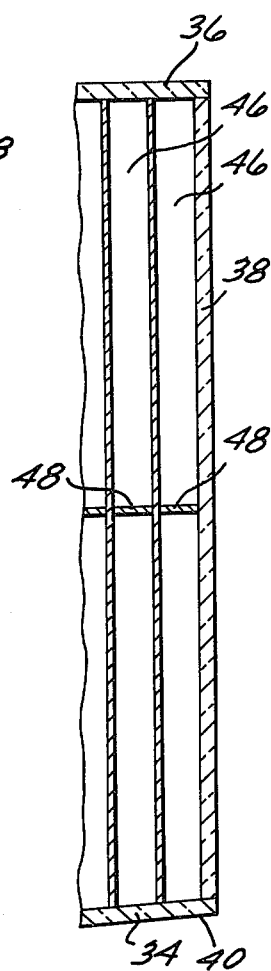
FIG. 5 is a partial cross-sectional view of the first preferred embodiment of the honeycomb panel utilized in the solar pond of the present invention, the view substantially truly showing the relative length- and width-wise dimensions of the multitude of honeycomb cells incorporated in the panel.

Thus, with principal reference to FIGS. 4 and 5, each honeycomb panel 18 is shown to include a multitude of intermediate glass plates 44 which divide the panel 18 into a multitude of honeycomb cells 46. In the first preferred embodiment of the honeycomb panel 18 of the present invention, the substantially vertically disposed intermediate plate 44 are arranged in two (2) directions perpendicular to each other, with the intermediate plates 44 of each direction being substantially regularly spaced and parallel to one another. In this manner, the honeycomb cells 46 are substantially square in horizontal cross-section, as is apparent in FIG. 4.

Figure 6:
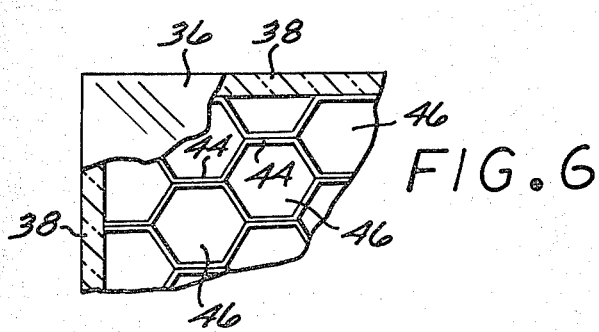
FIG. 6 is a partial cross-sectional view of a second preferred embodiment of the honeycomb panels utilized in the solar pond of the present invention, the cross-section being taken on a horizontal plane.

FIG. 6 indicates a second preferred embodiment of the honeycomb panel 18 used in association with the solar pond 16 of the present invention. In the second preferred embodiment, the intermediate plates 44 are disposed to provide a multitude of honeycomb cells 46 of substantially hexagonal horizontal cross-section. Still other configurations for the honeycomb cell 46 are possible within the scope of the present invention. For example, the honeycomb cells 46 may be of a configuration which is obtained when two sinusoidally corrugated sheets are bonded to one another with peaks to trough. This possible configuration of the honeycomb cells is not shown on the drawing figures.

As is best shown on FIG. 5, the honeycomb cells 46 are elongated in the vertical direction, i.e., the height of each cell 46, as determined by the distance between the bottom and top plates 34 and 36 of the panel 18, is substantially larger than the width of the cell 46. In case of cells 46 of other than square configuration, such as the cells shown on FIG. 6, the height of the cell 46 is still substantially larger than the major horizontal cross-sectional dimension of the cell 46. For the sake of comparing these dimensions, the diagonal dimensions of the hexagonal cell, or the diameter of a circle (not shown) substantially enveloping the cross-section of the cell (such as a hexagonal or "sinusoidal" cell) may be considered as the major horizontal cross-sectional dimension of the cell 46.

The ratio of the height of the honeycomb cell 42 to its major cross-sectional dimensions is critical in the present invention for the following reasons. In order for the panels 18 to function effectively as a heat trap, and thus to prevent escape of heat from the body of water 20, heat transfer by convection of air in the panels 18 must be eliminated, or at least very substantially suppressed.

It has been established in the prior art, that natural convection is eliminated or significantly suppressed in a tall thin structure, such as a thin tube, hexagonal or square cell. The extent of the suppression of convection depends on the relative height-to-width ratio of the cell. The theoretical considerations and calculations which demonstrate the influence of the relative dimensions of honeycomb cell structures on the suppression of thermally-induced air convection in the structures, are described in the following publications and reports: "Transparent Glass Honeycomb Structures for Energy Loss Control, Final Summary Report," prepared by School of Engineering and Applied Science, University of California, Los Angeles, Calif., for the United States Department of Energy under Contract No. POE-DE-FG-0376CS31084, June 1980; Master of Science in Engineering Thesis by Joseph C. McMurrin, titled "Model, Tests and Optimization of Flat Plate Solar Collectors, with Emphasis on Sinusoidal Honeycomb," submitted to the faculty of the University of California, Los Angeles, Calif., 1979; "Honeycomb Devices in Flat Plate Solar Collectors," by K. G. T. Hollands, *Solar Energy*, Volume 9, No. 3, p. 159 (1965); and "Prediction of Heat Transfer by Natural Convection in Closed Cylinders Heated from Below," by D. K. Edwards and I. Catton, International Journal of Heat and Mass Transfer, Volume 12, pp. 22–30 (1969).

Thus, the use of honeycomb cell structures capable of suppressing natural convection in flat plate solar collectors, was suggested in the prior art.

Returning now to the description of the present invention, it is noted that FIG. 5 shows substantially truly the relative height-to-width or aspect ratio of the cells 46 of the first preferred embodiment on the honeycomb panel 18 used in conjunction with the solar pond 16 of the present invention. Since the height of the cells 46 is thirty (30) cm and their width is 1.67 cm, the aspect ratio is 30:1.67 which equals approximately 17.96:1. The thickness of the intermediate plates 44 which divide the cells 46 from one another is approximately 0.02 cm. These cells substantially totally suppress natural convection. Because air contained in the cells 46 is a rather poor conductor of heat, heat loss by conduction through the honeycomb panels 18 is likewise minimal. Furthermore, heat loss by conduction through the glass material of the panels 18 is also minimal.

In accordance with the present invention, it was found to be highly desirable to further minimize heat loss through radiation by incorporating a cross-plate 48 in substantially the midsection of each honeycomb cell 46, as is shown particularly by FIGS. 4 and 5. The cross-plate or radiation shield 48 is also made of glass, and therefore permits short wave solar radiation to enter the body of water 20, but traps the outgoing infrared radiation.

In order to illuminate the desirability of the cross-plates or radiation shields 48 incorporated in the honeycomb cells 46, it is noted that during adequate weather conditions in the operating solar pond 16 the temperature of the water 20 below the honeycomb structure 28 is approximately 85° to 95° C., while the temperature of the ambient air above the honeycomb structure 28 is approximately 25° C. Thus the bottom plate 34 itself is also approximately at 85° to 95° C. In accordance with the well-understood Stefan-Boltzmann law of thermal radiation, a significant amount of thermal energy is emitted by the hot water 20 and particularly by the bottom plate 34. This thermal radiation is substantially reduced by the radiation shields or cross-plates 48. Although the radiation shields or cross-plates 48 in effect divide each cell 46 into two halves, and thereby reduce the effective aspect ratios of the half cells to approximately 9:1, the resulting half-cells with their lower aspect ratios are still capable of substantially totally suppressing convection in each of the half-cells.

Generally speaking, the aspect ratios of the cells in accordance with the present invention is approximately in the 14–18 to 1 range, and accordingly the aspect ratio of the half cells is approximately in the 7–9 to 1 range. In order to appreciate the above-noted ranges, it is noted that aspect ratios higher than the above-noted range do not detract from the performance of the solar pond 16, but add considerably to the cost of constructing the honeycomb panels 18. Cells having aspect ratios significantly less than 14 to 1 with a radiation shield in the midsection, or half cells having significantly lower than 7 to 1 aspect ratios are substantially less efficient in suppressing convection, and therefore provide a less effective heat trap.

The plurality of honeycomb panels 18 which cover the surface 30 of the body of water 20, are preferably tied or hooked to one another in the operating solar pond 16. Occasional cleaning of the upper surface of the top plates 36 is required in order to remove dirt, fallen leaves, debris and the like, and thereby to restore adequate transmittance to the honeycomb structure 28. The cleaning may be accomplished by flushing with water, or through the use of specifically designed service vehicles adapted for riding on the surface of the panels 18. Because of the modular nature of the panels 18, broken or otherwise inoperative panels 18 may be readily replaced.

Figure 7:
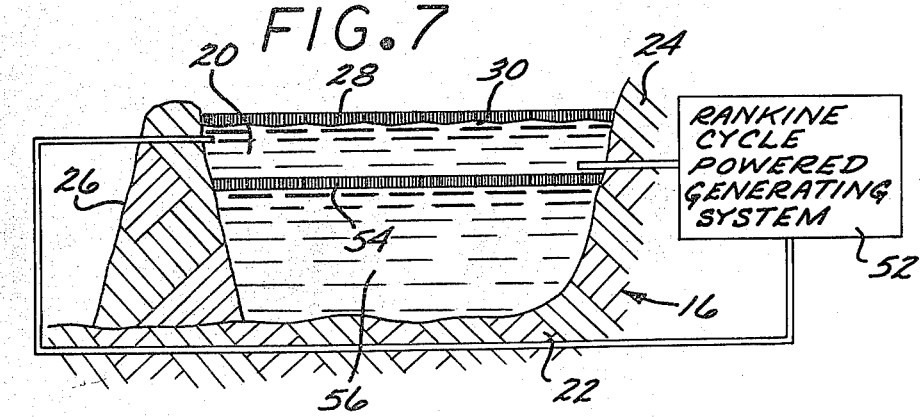
FIG. 7 is a schematic cross-sectional view showing another solar pond constructed in accordance with the principles of the present invention, wherein a solar energy absorbing and storing pond comprises a portion of a larger body of water.

As is shown on FIGS. 1 and 7, hot water is removed from the solar pond 16 for power generating or space heating purposes, and water exhausted of its thermal energy is recirculated into the solar pond 16. FIG. 7 schematically shows a Rankine cycle power generating system 52 wherein electric power is produced by the thermal energy captured in the solar pond 16.

FIG. 7 also illustrates the construction of a solar pond 16 in a natural or semi-natural body of water, by utilizing a natural embankment 24, a man-made dike 26, and a substantially horizontally disposed pond bottom 54 which separates the body of water into the upper solar pond 20 containing solar-heated hot water, and a lower pool 56 of cold water. The latter is readily utilized as a heat sink in the Rankine cycle power-generating system 52. Alternatively, the horizontally disposed pond bottom 54 can be dispensed with because a naturally occurring thermocline would effectively separate the upper layer of hot water from a lower layer of cold water.

It is estimated on the basis of theoretical calculations, that the salt gradient-free solar pond 16 of the present invention is more efficient for trapping solar energy than the prior art salt gradient ponds. This is because of the following factors.

In a salt-gradient solar pond, transmittance of the upper layer of water of low salinity and of the intermediate layer of water of increasing salt concentration, is a critical factor in determining how much solar energy is able to reach the lower layer of highly saline water where the effective trapping of heat, and thermal energy production occurs. Transmittance of waters taken from natural sources, such as, for example, from the Salton Sea in California, is always limited somewhat by presence of suspended and dissolved contaminants (such as debris, microbial living organisms and trace ions). For example, even for purified (carbon treated) Salton Sea water the solar transmittance is measured to be only approximately 0.26. In contrast, in the solar pond 16 of the present invention, the upper layers of the water 20 in the pond 16 are already effective to absorb the solar radiation, and therefore solar transmittance of the honeycomb structure 28 is the determining factor. This transmittance is approximately between 0.4–0.52.

In alternative embodiments of the solar pond 16 of the present invention the bottom plate 34 may be a nontransparent black body so that absorption of shortwave solar radiation occurs in the bottom plate 34. In this case, however, the underlying body of water 20 must be efficiently stirred or mixed to capture the heat of the bottom plate 34.

In a salt gradient solar pond, the effective heat insulator is the salt gradient zone in the pond. The honeycomb structure 28 used in the present invention is calculated to slightly outperform the salt gradient zone as a heat insulator.

Additional advantages of the solar pond of the present invention include the following. The water of the solar pond of the present invention does not have to be highly transparent to solar rays. It can be fresh, brackish, or saline water, relatively clear or turbid. Because the solar pond 16 of the present invention can use practically all types of naturally occurring waters, it can be constructed in many sites where construction of a salt-gradient pond is not feasible. The solar pond of the present invention poses no threat of contaminating the groundwater table, and therefore requires no liner. Furthermore, because the solar pond of the present invention does not require stratified layers of waters of different salt concentrations, the bottom of the solar pond of the present invention can be substantially uneven. Still further, because the solar pond of the present invention is effectively covered by the honeycomb structure, loss of water from the pond 16 by evaporation is minimized. During operation of the solar pond of the present invention, no complex salt gradient monitoring and maintaining system is required.

The above-noted and other advantages translate into construction and maintenance costs which are lower for the solar ponds of the present invention than for the prior art salt-gradient ponds. Several further advantages and modifications of the solar pond of the present invention may become readily apparent to those skilled in the art in light of the above disclosure. Therefore, the scope of the present invention should be interpreted solely from the following claims.

What is claimed is:

1. A honeycomb panel adapted for use in combination with like honeycomb panels as an effective heat insulator on the surface of a pond of water adapted for absorbing solar radiation and for serving as a source of thermal energy, said honeycomb panel comprising:
    a lower plate adapted to be disposed on the surface of the pond substantially parallel with said surface;
    an upper plate disposed substantially parallel with said lower plate at a predetermined distance above the lower plate;
    a plurality of side plates enclosing the panel and being mounted between the lower and upper plates in such a manner that the panel enclosed by the lower, upper and side plates is substantially watertight, and therefore buoyant relative to water;
    a multitude of substantially regularly spaced substantially vertically disposed thin intermediate plates mounted between the lower and upper plates to define a multitude of honeycomb cells of substantially identical dimensions and having a height substantially corresponding to the predetermined distance between the lower and upper plates, the height of the cells, and a major dimension of the cells in a direction normal to said height being of such magnitude that the ratio of height to the major dimension is approximately at least 14 to 1, and
    a radiation shield plate disposed in each cell substantially horizontally and intermediate between the lower and upper plates, said radiation shield plate dividing each cell into two sections isolated from one another and comprising means for substantially absorbing infrared radiation incident thereupon, the lower plate, upper plate, intermediate plates and radiation shield plates being made of a material substantially transparent to the short wave components of solar radiation, and substantially nontransparent to infrared radiation.

2. The honeycomb panel of claim 1 wherein the lower plate, the upper plate, the intermediate plates and the radiation shield plates are made of glass.

3. The honeycomb panel of claim 1 wherein the radiation shield plates are disposed substantially at a midsection of the honeycomb cells.

4. The honeycomb panel of claim 1 wherein the lower plate is slightly cambered upward from its center outwardly towards edges of the honeycomb panel.

5. A honeycomb panel in accordance with claim 1 and further comprising:
    means for extracting said thermal energy from said pond.

6. A honeycomb panel in accordance with claim 5 and further comprising means responsive to said thermal energy extracting means for producing electrical power therefrom.

7. A combination of a substantially salt-gradient-free pond and an insulating structure adapted for absorbing solar energy, storing the same and for serving as a source of significant amounts of thermal energy, said combination comprising:
    a large body of water contained in a suitable depression formed in the surrounding soil and having an upper surface normally exposed to solar radiation during daylight hours;
    an insulating honeycomb structure covering substantially the entire upper surface of said body of water, the honeycomb structure comprising means for allowing short wave solar radiation to penetrate into the body of water for absorption therein and for substantially preventing escape of thermal energy from said body of water through the upper surface;
    said honeycomb structure further comprising a plurality of honeycomb panels having substantially adjoining edges, each honeycomb panel being buoyant relative to water and comprising an enclosing lower plate means, disposed on and supported by the upper surface of the body of water, an enclosing upper plate disposed substantially parallel with the lower plate at a predetermined height above the lower plate, said predetermined height determining the height of a multitude of vertically-oriented honeycomb cells of each of the honeycomb panels, a plurality of enclosing side plates mounted between the upper plate and the lower plate means, and a multitude of substantially regularly spaced intermediate plates disposed substantially vertically between the upper plate and the lower plate means, the intermediate plate means forming a multitude of honeycomb cells in each honeycomb panel;

each honeycomb cell having a major dimension in a direction normal to its height, which dimension is defined as a width of the cell, and wherein all cells are substantially identical in dimensions and have a height-to-width ratio of approximately at least 14 to 1;

a radiation shield means in said honeycomb structure pervious to short wave solar radiation and substantially impervious to infrared radiation, said shield means disposed substantially in an intermediate portion of said honeycomb structure, the radiation shield means aiding in preventing escape of thermal energy from said body of water by radiation; and said lower plate means of each honeycomb panel comprising a shape being slightly cambered upwardly towards edges of the panel for facilitating escape of vapor and gas bubbles from underneath the panel.

8. A combination of a substantially salt-gradient-free pond and an insulating structure adapted for absorbing solar energy, storing the same and for serving as a source of significant amounts of thermal energy, said combination comprising:

a large body of water contained in a suitable depression formed in the surrounding soil and having an upper surface normally exposed to solar radiation during daylight hours;

an insulating honeycomb structure covering substantially the entire upper surface of said body of water, the honeycomb structure comprising means for allowing short wave solar radiation of penetrate into the body of water for absorption therein and for substantially preventing escape of thermal energy from said body of water through the upper surface;

said honeycomb structure further comprising a plurality of honeycomb panels having substantially adjoining edges, each honeycomb panel being buoyant relative to water and comprising an enclosing lower plate means, disposed on and supported by the upper surface of the body of water, an enclosing upper plate disposed substantially parallel with the lower plate at a predetermined height above the lower plate, said predetermined height determining the height of a multitude of vertically-oriented honeycomb cells of each of the honeycomb panels, a plurality of enclosing side plates mounted between the upper plate and the lower plate means, and a multitude of substantially regularly spaced intermediate plates disposed substantially vertically between the upper plate and the lower plate means in each of the honeycomb panels, the intermediate plate means forming a multitude of upper honeycomb cells in each honeycomb panel;

each honeycomb cell having a major dimension in a direction normal to its height which dimension is defined as a width of the cell, and wherein all cells are substantially identical in dimensions and have a height-to-width ratio of approximately at least 14 to 1, and wherein all honeycomb cells are substantially identical in dimensions with a substantially, square-shaped cross-section taken in a horizontal plane;

a substantially horizontally arranged radiation shield means at the mid-section of each cell in said honeycomb structure pervious to short wave solar radiation and substantially impervious to infrared radiation, said shield means disposed substantially in an intermediate portion of said honeycomb structure for preventing escape of thermal energy from said body of water by radiation; and said lower plate means, upper plates, side plates and intermediate plates are made of glass.

9. A solar pond adapted for absorbing and effectively storing solar energy and having a large body of liquid with an upper surface normally exposed to solar rays during daytime hours; said solar pond being covered by an insulating structure comprising:

a substantially transparent vertically-oriented honeycomb structure substantially watertight and buoyant floating upon the upper surface of the liquid of the pond, and substantially covering said entire upper surface, the honeycomb structure having a multitude of adjoining elongated vertically-oriented cells with each cell having a substantially vertically-disposed longitudinal axis that is several times the width dimension of the cell, whereby heat losses from the body of liquid through the upper surface are substantially eliminated;

a radiation shield means disposed substantially horizontally intermediate the ends of each of said elongated cells to divide each of the cells into upper and lower sections, said shield means made of a material selected to be substantially transparent to the short wave components of solar radiation and substantially nontransparent to infrared radiation; and means for extracting thermal energy trapped in said pond by said honeycomb structure.

* * * * *